United States Patent [19]

Solome

[11] 3,858,470
[45] Jan. 7, 1975

[54] FRENCH AND ITALIAN BREAD SLICER

[76] Inventor: Frank J. Solome, 1921 Whittier, Schaumburg, Ill. 60172

[22] Filed: Feb. 19, 1974

[21] Appl. No.: 443,698

[52] U.S. Cl.................... 83/149, 83/163, 83/425.3, 83/435, 83/435.2
[51] Int. Cl............................................. B26d 7/06
[58] Field of Search ......... 83/407, 149, 163, 425.3, 83/435, 435.2, 436

[56] References Cited
UNITED STATES PATENTS

| | | | |
|---|---|---|---|
| 1,082,926 | 12/1913 | Bondeson | 83/149 X |
| 2,151,377 | 3/1939 | Economakis | 83/163 X |
| 2,506,117 | 5/1950 | Stiefvater | 83/435.2 X |
| 3,349,822 | 10/1967 | Rauth | 83/425.3 X |

Primary Examiner—Willie G. Abercrombie
Attorney, Agent, or Firm—Robert W. Erickson

[57] ABSTRACT

A bread slicer adaptable for slicing loaves of elongated "French," or "Italian" bread into substantially uniform pieces. The end cuts from the loaves are removed from the slicer separately from the desired, uniform center pieces. Circular saw blades, of the cross-cut variety, function as the slicing means, and two sets of elastically compressible rollers are utilized (1) to maintain the loaves in contact with conveying means as they pass through the saw blades and, (2) to prevent the blades from randomly kicking the pieces off the conveyor belts at varying rates and in different directions.

15 Claims, 5 Drawing Figures

FRENCH AND ITALIAN BREAD SLICER

APPLICABILITY OF INVENTION

My invention is intended to be utilized in the slicing of a loaf of bread into substantially uniform pieces and simultaneously separating the end cuts from the desired center pieces. More specifically, the bread slicer, encompassed by the invention herein described, affords particular advantages with respect to elongated, relatively thin loaves of bread which have come to be commonly referred to as "French," or "Italian" bread. In the present specification, these terms are synonymously used to connote the familiar loaf of bread which is considerably longer than it is thick, or high. Slices, or pieces of such bread are extensively utilized in the preparation of sandwiches popularly referred to as "submarine" sandwiches, "Italian beef" sandwiches, etc. The advantages, functional, operational and economical, which are afforded through the use of the present invention, are numerous, and will be immediately hereinafter recognized as the bread slicer is described in greater detail. Briefly, however, the principal advantages include a greater number of loaves processed in a given length of time, accompanied by a lesser quantity of waste material and the removal of the end cuts separately from the desired center pieces. Machine operation is facilitated and the time lapse between normally scheduled maintenance turn-arounds can be lengthened; regarding the latter, each turn-around requires a lesser amount of down-time. The slicer is, of course, intended for commercial use as contrasted to home use.

PRIOR ART

Candor compels recognizing the fact that automatic (powered) bread slicers are not numbered among the most recent technical developments. Any attempt to delineate exhaustively the entire history of bread slicing would be an exercise in futility; it will suffice merely to state that almost everyone cognizant of the baking industry will recall the table model, multi-knifed slicers conspicuously in evidence in every local bakery shop. With respect to large, commercial baking concerns, producing great quantities of French bread slices, a series of band saws have been and are widely accepted tools of the trade. There are attendant the utilization of band saws, however, numerous disadvantages and problems which are readily overcome and solved by the present bread slicer. For example, the dispersion of heat, resulting from a high degree of friction, is difficult, if not impossible to attain satisfactorily with band saws. The ultimate effect is short-lived band saws, due to severe warping and breaking; the use of cross-cut circular saw blades provides sufficient air cooling which greatly diminishes warping and breaking, and significantly decreases the amount of waste material. Thus, there is afforded the economic enhancements which arise from less waste and a significant decrease in the inventory of spare parts required, not to mention the time element connected with a shut-down. Furthermore, band saws are notoriously more difficult to operate efficiently and simply, especially when the objective concerns the volume of bread intended to be processed in a given interval of time. Also, as previously set forth, the bread slicer encompassed by the present invention effects separation of the small end cuts from the center pieces, and recovers the desired sliced product free from end cut pieces.

OBJECTS AND EMBODIMENTS

A principal object of my invention is to provide a bread slicer capable of producing uniform pieces from a loaf of bread. A corollary objective resides in a bread slicer adaptable for use in slicing elongated loaves of French and/or Italian bread, producing substantially uniform center pieces.

Another, more specific object of the present invention is to afford a slicer which effects separation of relatively small end cuts from the desired center piece products.

These objects, as well as many others which will become evident, are achieved through the utilization of a bread slicer, for slicing an elongated loaf of bread into a plurality of substantially uniform pieces, which slicer comprises, in cooperative combination: (a) bread-conveying means consisting of a plurality of elongated individual conveyor belts in a side-by-side relation, each of which is separated a finite distance from adjacent belts; (b) a plurality of vertical circular saw blades, alternately disposed between said belts, the upper horizontal tangent of said blades being above said belts a distance greater than the thickness of said loaf; (c) a plurality of compressible primary rollers, alternately disposed between said saw blades and superimposed over said belts, the lower horizontal tangent of said primary rollers being below the upper horizontal tangent of said saw blades to the extent that said loaf is forced downwardly thereby to maintain contact with said conveyor belts; and, (d) a plurality of compressible secondary rollers, superimposed over said belts in substantial alignment with said primary rollers; said bread slicer being further characterized in that said conveyor belts are supported by a horizontal plate, extending substantially the entire length of said belts, of a width greater than said conveying means.

Other objects and specific embodiments will become evident from the following, more detailed summary of the present invention. Such other embodiments are principally directed toward particular placement of the primary and secondary rollers, with respect to each other, as well as the circular saw blades and the conveyor belts; preferred techniques and means for separation of the end cuts; and, the physical characteristics of the primary and secondary rollers, etc. For example, while the secondary rollers preferably are as long as the primary rollers, the cross-sectional area is less.

SUMMARY OF INVENTION

Prior to describing the bread slicer further, it is believed that several definitions of various terms used in the specification and the appended claims is justified in order that a clear understanding is obtained and ambiguities are avoided. Thus, the front of the overall slicer is considered that side from which the loaves of bread are placed on the conveying means; the rear, therefore, is that side toward which the individual belts move; thus, obviously, the edges of the slicer are those sides which are parallel to the movement of the conveyor belts. The bread-conveying means consists of a plurality of elongated conveyor belts in side-by-side relation, each of which is separated from adjacent belts a finite distance. In using the term "finite," it is intended to allude to a distance which is sufficient to allow for the thickness of the circular saw blade and a tolerance on both sides thereof such that the surface of the blade does not come into contact with the edges of the conveyor belts. This finite distance is preferably the minimum necessary to achieve this result.

Both sets of primary and secondary rollers are stated as being superimposed over the conveyor belts, with the secondary rollers in substantial alignment with said primary rollers. "Superimposed" connotes the fact that any single roller, in either set, is fully contained within the confines defined by the edges of the individual belts. The "alignment" of the secondary rollers with the primary rollers indicates that they are substantially the same length, and that their respective outer edges lie in planes which are parallel to each other, if such edges are not in the same plane. "Horizontal tangents" of the various elements of the bread slicer — i.e. primary rollers, saw blades and secondary rollers — are those tangents which lie in planes parallel to the plane containing the upper surfaces of the conveyor belts. Definitions of additional terms, as utilized herein, will be given both in the continuing summary and in the description of the present invention as illustrated in the accompanying drawings.

The conveyor belts, comprising the conveying means, are supported by a horizontal plate which extends substantially the entire length of the belts, and is wider than the width of the conveying means. Preferably, all the belts are the same width excepting those belts which may be installed at the side edges of the conveying means. These side belts are narrower in width than the intermediate belts in view of the fact that they carry the end cuts of the loaf of bread. Since the conveyor belts loop around both front and rear rollers situated at the front and rear of the slicer, the horizontal support plate terminates short of the belt rollers. This clearance is necessary in order to provide uninhibited rotation of the belt rollers, as well as the individual conveyor belts. It is not, of course, critical to the present invention that the clearance be a specifically determined length.

A plurality of vertical circular saw blades, of the common cross-cut variety, are alternately disposed between conveyor belts. When narrower belts are not installed at the edges of the conveying means, only the interior saw blades have belts on both sides thereof. Each circular saw blade will have at least about fifteen teeth to the inch, and preferably at least about twenty. All the blades are coaxially disposed on a single shaft. This shaft is perpendicular to the conveyor belts, and is located a distance below the horizontal support plate such that the upper horizontal tangent of the blades is above the belts a distance greater than the thickness of the loaf of bread.

Primary rollers are alternately disposed between the saw blades, and are superimposed over the interior conveyor belts. That is, the primary rollers number the same as those conveyor belts having the same width, and are not superimposed over the narrower belts at the outer edges of the conveying means. The lower horizontal tangent of the primary rollers is below the upper horizontal tangent of the saw blades, and to the extent that the loaf of bread is forced downwardly to maintain contact with the belts as it is being sliced. Preferably, the primary rollers are disposed such that they contact the conveyor belts when the bread loaf is not therebetween. The primary rollers are elastically compressible, being fabricated from a suitable material which is easily compressible, but returns substantially to its original shape; such material can be styrofoam, soft rubber, a mixture thereof, etc. In a preferred embodiment, the length of the primary roller is less than the width of the conveyor belt over which it is superimposed. All the primary rollers are preferably coaxially disposed on a single shaft, and are the same size.

Elastically compressible secondary rollers are also superimposed over the conveyor belts, and are in substantial alignment with the primary rollers. As previously stated with respect to the primary rollers, the secondary rollers number the same as the interior conveyor belts, and are not superimposed over the narrower belts which may be installed at the outer edges of the conveying means. With respect to the directional movement of the conveyor belts, the secondary rollers are disposed behind the primary rollers. The secondary rollers, being preferebly of the same length as the primary rollers, are all disposed on a single shaft, and are out of contact with the primary rollers. Furthermore, the secondary rollers do not come into direct contact with the conveyor belts. The lower horizontal tangent of the secondary rollers is above the belts, however, at a distance less than the height of the bread loaf. These secondary rollers serve to prevent the saw blades from randomly kicking the bread pieces off the conveyor belts at varying rates and in different directions. This detrimental effect would otherwise occur since the blades are revolving at a considerable higher RPM than are the primary rollers and the conveyor belts.

The narrower belts, which carry the end cuts from the loaf of bread, may, or may not be utilized at the edges of the conveying means. In any event, it is preferred that at least one side edge of the horizontal support plate have disposed thereon a vertical guide bar, against which the end of the loaf moves as it is carried by the conveying means. It is understood that the guide bar can be employed in the absence of the narrower conveyor belt, or in conjunction therewith. The guide bar will terminate at a locus which is intermediate the rear cutting edge of the circular saw blades and the end of the conveying means. When the guide bar is utilized at a side edge of the conveying means which does not have one of the narrower belts, the horizontal support plate contains an aperture therethrough. This is adapted to receive the end cut of the bread loaf, whereby the end cut is removed from the upper surface of the bread slicer.

Since the guide bar is necessary only at one side edge of the conveying means, and the end cut of the bread loaf are two, the present invention provides, in a specific embodiment, another technique for the removal of the end cuts separately from the desired center pieces. An angular diverter is superimposed over a narrower belt at the edge of the conveying means in a manner such that the end cut carried thereby is removed from the surface of the moving belt and diverted off the side edge of the bread slicer.

Furhter description of the present invention will be made in conjunction with the accompanying drawings which present several views of the bread slicer. In this manner, a clear understanding will be made available to those having the requisite expertise in the appropriate art.

BRIEF DESCRIPTION OF THE DRAWINGS

The bread slicer encompassed by my invention is represented by the several views illustrated in the accompanying drawings. Since these are presented herein solely for the purposes of illustration, they have not been drawn to scale, but are somewhat out of proportion in order to project a concise description and to convey a clear understanding. Furthermore, only a portion of the entire support frame is shown, it being considered that such is readily within the purview of the routineer. For like reasons, the mounting and supporting members for the various shafts and/or rollers have been omitted as being non-essential either to the invention, or to the understanding thereof.

Briefly referring now to the drawings.

DETAILED DESCRIPTION OF DRAWINGS

Figure 1:
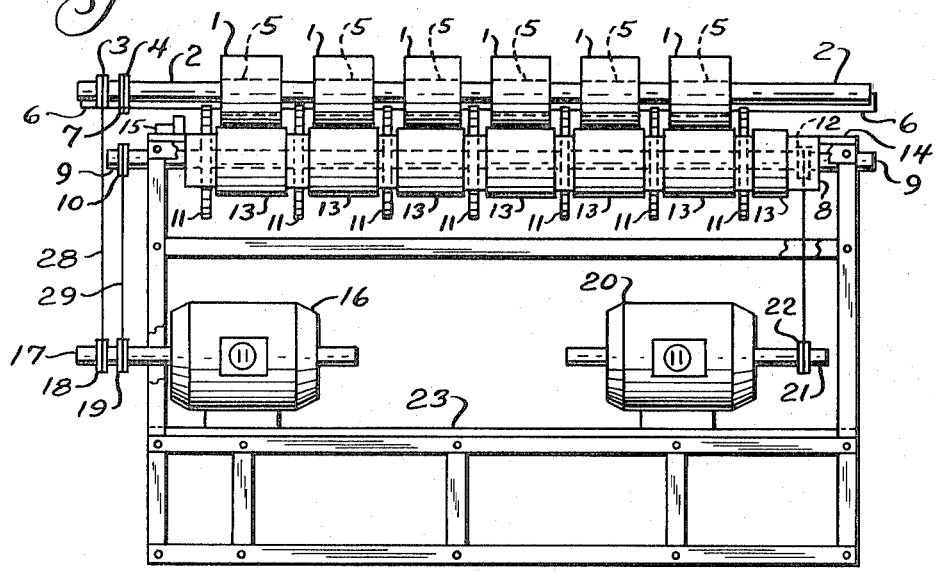
FIG. 1 is a front elevation, being that end of the slicer from which the whole loaves of bread are fed into conveyor belts 13, to be carried thereby into circular saw blades 11. Prominent in this view are front roller 8 for conveyor belts 13, main rollers 1 which maintain the bread in contact with the belts and vertically-disposed circular cross-cut saw blades 11.

With specific reference now to the drawings, FIG. 1 is a front elevation of the bread slicer in which the bread conveying means is shown as comprising seven individual conveyor belts 13, the first six of which have substantially the same width. The conveyor belt shown on the right side is narrower, being approximately half as wide as the others. Conveyor belts 13 are looped around front belt roller 8, to which revolving motion is supplied by way of shaft 9 containing drive pulley 10.

Figure 2:
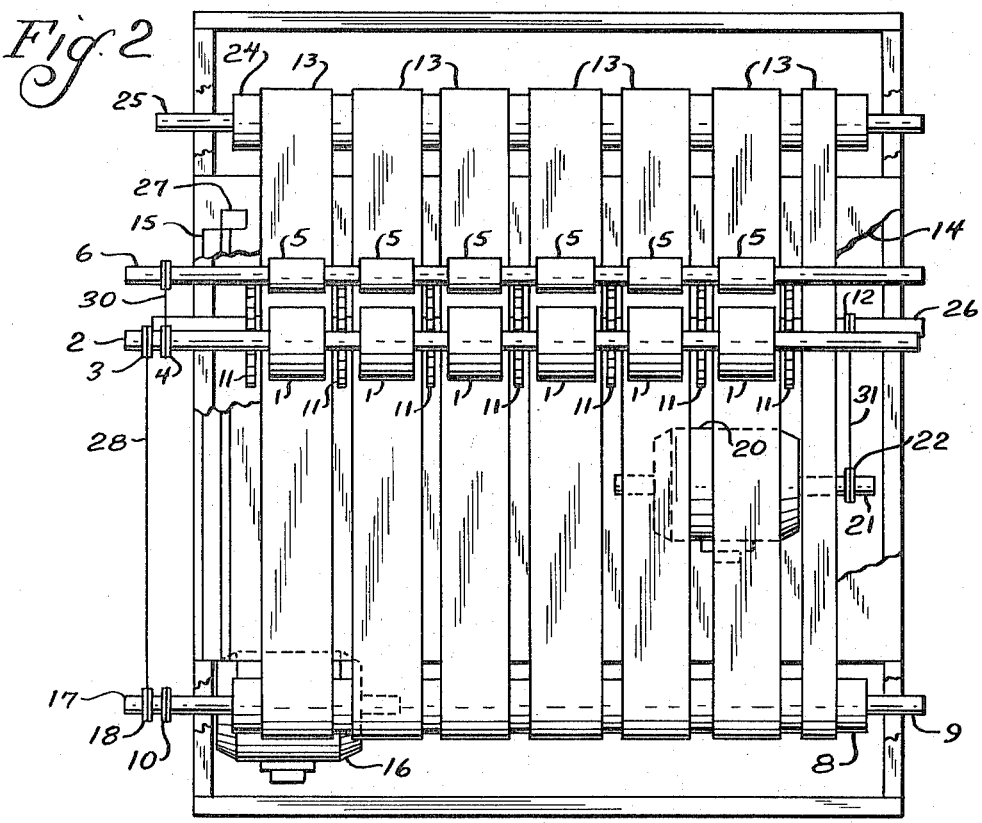
FIG. 2 is a plan view indicating the relationship of front belt roller 8, conveyor belts 13, rear roller 24, primary rollers 1, secondary rollers 5 and the circular saw blades 11.

A plurality of elastically compressible primary rollers 1 are superimposed over conveyor belts 13, and are in contact therewith. In this illustration, primary rollers 1 number the same as the wide belts 13, and have a length less than the width of the belts. Revolving motion is supplied to primary rollers 1 by way of shaft 2 containing pulleys 3 and 4. In this view, compressible secondary rollers 5, on shaft 6, are hidden behind primary rollers 1. As shown in FIG. 2 (a plan view), secondary rollers 5 are not as thick as the primary rollers, and, with respect to the direction of movement of conveyor belts 13, are disposed behind the primary rollers, and are not in contact therewith.

The primary rollers are driven by pulley 3 which receives power by way of drive belt 28 and power pulley 18, the latter being disposed on shaft 17 of motor 16. Secondary rollers 5 are caused to rotate by drive pulley 7, disposed on shaft 6, which is driven via drive belt 30 and power pulley 4, the latter being disposed on primary roller shaft 2. Shaft 17, of motor 16, also contains power pulley 19 which, via drive belt 29 and pulley 10, effects the rotating movement of front belt roller 8. In turn, conveyor belts 13 move toward primary rollers 1 and the rear of the bread slicer.

Circular cross-cut saw blades 11 are vertically disposed on shaft 26, containing drive pulley 12. Saw blades 11 are alternatively situated between conveyor belts 13, with the exception of the saw blade on the left side of the bread slicer. The upper horizontal tangent of saw blades 11 is above conveyor belts 13 a distance greater than the thickness of the bread loaf so that a complete, thorough cut is made. Movement of the circular saw blades is effected by drive belt 31, powered by pulley 22 disposed on shaft 21 of motor 20, and drive pulley 12. Motors 16 and 20 are supported by plate 23, the edge of which is shown in FIG. 1.

The upper surfaces of conveyor belts 13 are supported by a horizontal table-top plate 14; in the front elevation view of FIG. 1, support plate 14 has, on the left-side edge thereof, a vertical guide bar 15. In the operation of the bread slicer, the loaves are placed upon the conveyor belts 13 with the left-hand ends resting against guide bar 15.

As hereinbefore stated, FIG. 2 represents the plan view of the bread slicer, and illustrates the spacial relationship of conveyor belts 13, saw blades 11, primary rollers 1, secondary rollers 5 and front belt roller 8. The rearward ends of conveyor belts 13 loop around rear belt roller 24 which revolves around shaft 25. Horizontal support plate 14, functioning as a table top for conveying belts 13, is shown as commencing at the front end of the slicer just in front of belt roller 8, and terminating just short of the rear belt roller 24. Vertical guide bar 15 is located at the left-hand side of the bread slicer, commencing at the front edge of horizontal belt support plate 14, and terminating short of the rear edge thereof. An aperture 27 is provided in support plate 14, at the terminal end of guide bar 15. This affords one technique of separating the end cuts from the desired center pieces; the former are pushed into aperture 27 by subsequent end cuts, fall through the aperture and are collected below the surface of the conveying means.

Figure 3:
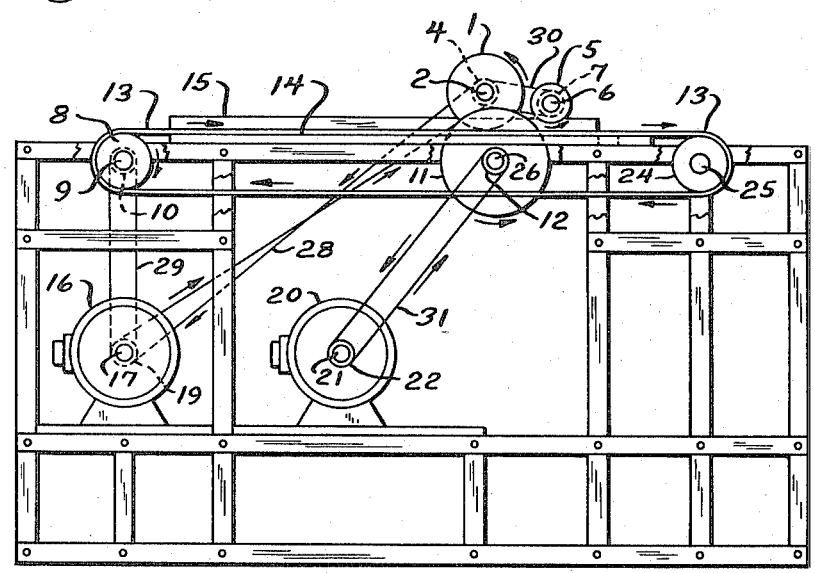
FIG. 3 is a right-side elevation, again showing the relationship of the major elements of the bread slicer, as in FIG. 2, and further, the driving mechanisms initiated, or activated by motors 16 and 20.

FIG. 3 is a right-side view of the bread slicer, and illustrates the directions of rotations of the various principal elements in relationship to the conveyor belts 13. Belt rollers are caused to rotate in a clockwise direction such that the belt movement is from left to right, or from the front of the slicer toward the rear. It should be noted that drive belt 28, connecting power pulley 18 to primary roller drive pulley 3, is crossed so that the primary rollers 1 rotate counter-clockwise. In FIG. 3, power pulley 18 is hidden behind pulley 19, while drive pulley 3 is hidden behind pulley 4. The relationship is, however, clarified in FIGS. 1 and 2. Secondary rollers 5 are shown as having a lesser cross-sectional area, or nominal diameter, than primary rollers 1. Furthermore, they are disposed a finite distance behind primary rollers 1, as well as a finite distance above conveyor belts 13. The precise distance of the lower horizontal tangent of secondary rollers 5 above the conveyor belts is not critical to my invention; it should not, however, be so great as to exceed the thickness of the loaf of bread. These secondary rollers, which are rotating at an RPM significantly less than circular saw blades 11, prevent the sliced pieces of bread, as they leave the rear of the blades, from being kicked off the conveying means at varying rates and in different directions. The effect is to cause a decrease in the speed of the pieces such that they attain the speed of the conveyor belts. In other words, the center pieces of bread are more uniformly removed from the rear end of the slicer at approximately the same rate as the bread loaves are fed into the circular saw blades.

Figure 4:
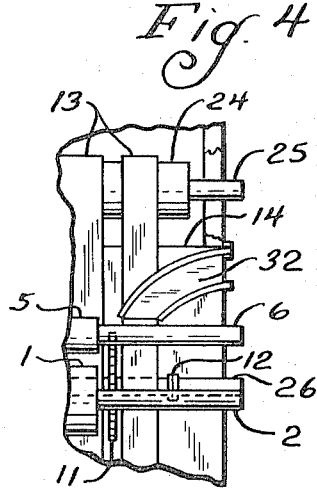
FIG. 4 is a partial view of the top of the bread slicer indicated in FIG. 3, and shows the relationship of angular diverter means 32 with respect to the narrow conveyor belt 13. In this embodiment, the diverter means is shown as a chute out of which the end cuts drop off the side edge of the bread slicer.
Figure 5:
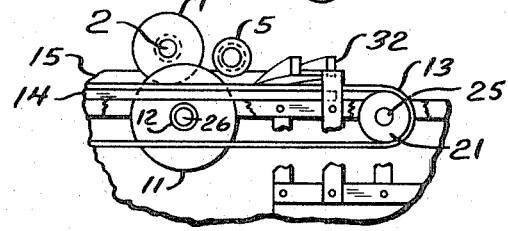
FIG. 5 is a right-side view of the angulaar diverter means 32 as shown in FIG. 4.

FIG. 4 is a partial plan view of the right-side edge of the bread slicer, and is presented to illustrate a second technique for removing end cuts from the conveying means, and thus separating the same from the desired center pieces. An end cut chute 32 is superimposed over narrow conveyor belt 13 as the angular diverter. The end cut is carried onto the chute by conveyor belt 13, and is ultimately pushed off the side of the bread slicer by subsequent end cuts. FIG. 5 is a right-side view of FIG. 4, and illustrates more clearly the relation of chute 32 with the other elements of the bread slicer.

Referring once again to FIGS. 2 and 3, the operator of the slicer places a loaf of bread on conveyor belts 13 with the left-hand end thereof being set against vertical guide bar 15. The right-hand end of the bread loaf is carried along by the narrower conveyor belt. Seven cuts are made in the loaf by circular saw blades 11, with the loaf being maintained in contact with the conveyor belts by compressible primary rollers 1. Since these are elastically compressible, they return substantially completely to their original shape after the center pieces of bread have passed thereunder. The center pieces are then carried into and under secondary rollers 5, also elastically compressible, which serve to counteract the increased speed of the center pieces as they clear saw blades 11. The left-hand end cut is ultimately pushed into aperture 27, by subsequent end cuts, while the right-hand end cut is carried off the conveyor belt by way of chute 32, which was hereinbefore described with reference to FIGS. 4 and 5.

The foregoing is believed to provide a clear understanding of the present bread slicer, both in regard to its configuration, its method of operation and the benefits afforded through the utilization thereof.

I claim as my invention:

1. A bread slicer, for slicing an elongated loaf of bread into a plurality of substantially uniform pieces, which slicer comprises, in cooperative combination:
   a. bread-conveying means consisting of a plurality of elongated individual conveyor belts in side by side relation, each of which is separated a finite distance from adjacent belts;
   b. a plurality of vertical circular saw blades, alternately disposed between said belts, the upper horizontal tangent of said blades being above said belts a distance greater than the thickness of said loaf;
   c. a plurality of compressible primary rollers, alternately disposed between said saw blades and superimposed over said belts, the lower horizontal tangent of said primary rollers being below the upper horizontal tangent of said saw blades to the extent that said loaf is forced downwardly thereby to maintain contact with said conveyor belts; and,
   d. a plurality of compressible secondary rollers, superimposed over said belts in substantial alignment with said primary rollers and, with respect to the direction of movement of said belts, being disposed behind said primary rollers;

said bread slicer being further characterized in that said conveyor belts are supported by a horizontal plate, extending substantially the entire length of said belts, of a width greater than said conveying means.

2. The bread slicer of claim 1 further characterized in that the length of each primary roller is less than the width of the belt over which it is superimposed.

3. The bread slicer of claim 1 further characterized in that said primary rollers contact said belts when a bread loaf is not therebetween.

4. The bread slicer of claim 1 further characterized in that said secondary rollers are disposed out of contact with said primary rollers.

5. The bread slicer of claim 1 further characterized in that the lower horizontal tangent of said secondary rollers is above said belts a distance less than the height of said bread loaf.

6. The bread slicer of claim 1 further characterized in that the number of secondary rollers is equal to the number of primary rollers.

7. The bread slicer os claim 1 further characterized in that the nominal cross-sectional area of said secondary rollers is less than that of said primary rollers.

8. The bread slicer of claim 1 further characterized in that at least one of the belts at the side edges of said conveying means, which belt carries on end cut of the loaf, is narrower in width than the belts intermediate the edges of said conveying means.

9. The bread slicer of claim 8 further characterized in that angular diverter means are superimposed over said narrower belt in a manner such that the end cut of said loaf is removed from the surface of the moving belt and diverted off the side edge of the bread slicer.

10. The bread slicer of claim 1 further characterized in that a vertical guide bar is disposed at one side edge of said horizontal plate, against which the end of the loaf moves as it is carried by said conveying means.

11. The bread slicer of claim 10 further characterized in that said guide bar terminates at a locus intermediate the rear cutting edge of said saw blades and the end of said conveying means.

12. The bread slicer of claim 10 further characterized in that said horizontal plate contains an aperture at the terminal end of said guide bar, said aperture adapted to receive the end cut of said bread loaf, whereby the end cut is removed from the upper surface of said bread slicer.

13. The bread slicer of claim 1 further characterized in that said saw blades are coaxially disposed on a single shaft.

14. The bread slicer of claim 1 further characterized in that said primary rollers are coaxially disposed on a single shaft.

15. The bread slicer of claim 1 further characterized in that said secondary rollers are coaxially disposed on a single shaft.

* * * * *